(12) United States Patent
Smith

(10) Patent No.: US 8,977,396 B2
(45) Date of Patent: Mar. 10, 2015

(54) MOBILE ROBOTIC ASSISTANT FOR MULTIPURPOSE APPLICATIONS

(75) Inventor: David Smith, San Diego, CA (US)

(73) Assignee: Sony Corporation, Tokyo (JP)

( * ) Notice: Subject to any disclaimer, the term of this patent is extended or adjusted under 35 U.S.C. 154(b) by 206 days.

(21) Appl. No.: 13/425,252

(22) Filed: Mar. 20, 2012

(65) Prior Publication Data

US 2013/0253703 A1 Sep. 26, 2013

(51) Int. Cl.
 *B25J 13/08* (2006.01)
 *B25J 19/02* (2006.01)
 *B25J 5/00* (2006.01)
(52) U.S. Cl.
 CPC *B25J 5/00* (2013.01); *B25J 19/023* (2013.01); *Y10S 901/01* (2013.01)
 USPC .............................................. 700/258; 901/1
(58) Field of Classification Search
 CPC .......... H04N 13/0459; H04N 21/4122; H04N 7/157; B25J 11/0005; B25J 19/023; B25J 5/00; G03B 21/00; G06F 3/14; G06F 3/0325; H04L 65/4046
 USPC ............ 901/1, 46, 47, 50; 700/250, 257, 258, 700/262
 See application file for complete search history.

(56) References Cited

U.S. PATENT DOCUMENTS

| | | | |
|---|---|---|---|
| 6,549,215 B2 * | 4/2003 | Jouppi | 345/660 |
| 8,104,889 B2 * | 1/2012 | Lapstun et al. | 347/109 |
| 2005/0213082 A1 * | 9/2005 | DiBernardo et al. | 356/139.03 |
| 2006/0195226 A1 * | 8/2006 | Matsukawa et al. | 700/245 |
| 2007/0064092 A1 * | 3/2007 | Sandbeg et al. | 348/14.02 |
| 2008/0143889 A1 * | 6/2008 | Mukaida et al. | 348/789 |
| 2009/0055019 A1 | 2/2009 | Stiehl et al. | |
| 2009/0059182 A1 * | 3/2009 | Ha et al. | 353/69 |
| 2010/0036393 A1 * | 2/2010 | Unsworth | 606/130 |
| 2010/0268383 A1 * | 10/2010 | Wang et al. | 700/248 |
| 2010/0289664 A1 * | 11/2010 | Mizushima et al. | 340/691.6 |
| 2011/0288684 A1 | 11/2011 | Farlow et al. | |
| 2012/0314017 A1 * | 12/2012 | Gross | 348/14.07 |
| 2012/0327315 A1 * | 12/2012 | Larsen et al. | 348/745 |

* cited by examiner

*Primary Examiner* — Jason Holloway
(74) *Attorney, Agent, or Firm* — Moser Taboada

(57) ABSTRACT

Embodiments of the present invention relate to a robotic assistant comprising a projector for projecting media on a surface, a sensor for sensing the media, and a motion control module for moving the robotic assistant.

20 Claims, 5 Drawing Sheets

MOBILE ROBOTIC ASSISTANT FOR MULTIPURPOSE APPLICATIONS

BACKGROUND OF THE INVENTION

1. Field of the Invention

Embodiments of the present invention generally relate to media projection, and more particularly, to a mobile robotic assistant for multipurpose applications.

2. Description of the Related Art

Mobile projectors are often used in home and office settings for projecting video, presentations, reports and the like to large audiences. Often, these projectors are rather large and unwieldy due to increased circuitry for high definition projection. If the projector is needed in another area of the house or office, a user must pick it up to relocate it manually. The weight of the projector and the multitude of cable couplings from the projector make it especially difficult for the elderly or children to move the projector unless they have assistance. In other instances, an office or conference room only has one projection screen statically fixed to the ceiling or a wall, available for viewing the presentation. A problem exists when the user desires that the presentation or report be shown in a different office or conference room, it becomes difficult to remove all of the cable couplings from the projector and lift the projector to relocate it. Another problem exists when a user would like to project media from a projector in an area where there are flat surfaces, but calibrating the projector to properly display the media is cumbersome and difficult, involving excessive trial and error by the user leading to user frustration.

Therefore, there is a need in the art for a mobile robotic assistant for assisting in projecting media in different offices and rooms and calibrating the projections dynamically.

SUMMARY OF THE INVENTION

Embodiments of the present invention comprise a robotic assistant comprising a projector for projecting media on a surface, a sensor for sensing the media, and motion control for moving the robotic assistant.

Embodiments of the present invention further comprise utilizing a robotic assistant for projecting media on a surface, sensing media in a surrounding environment and moving the robotic assistant.

DETAILED DESCRIPTION OF EMBODIMENTS

Embodiments of the present invention generally relate to a mobile robotic assistant for multipurpose applications. The robotic assistant possesses a plurality of built in functional capabilities including, but not limited to, audio sensing, with integrated voice command recognition, image (or video) sensing, and image (or video) projection. The robotic assistant comprises a projector for projecting media including, but not limited to, audio and video, a sensor for sensing or detecting the media and a motion control module for managing movement of the robotic assistant.

Figure 1:
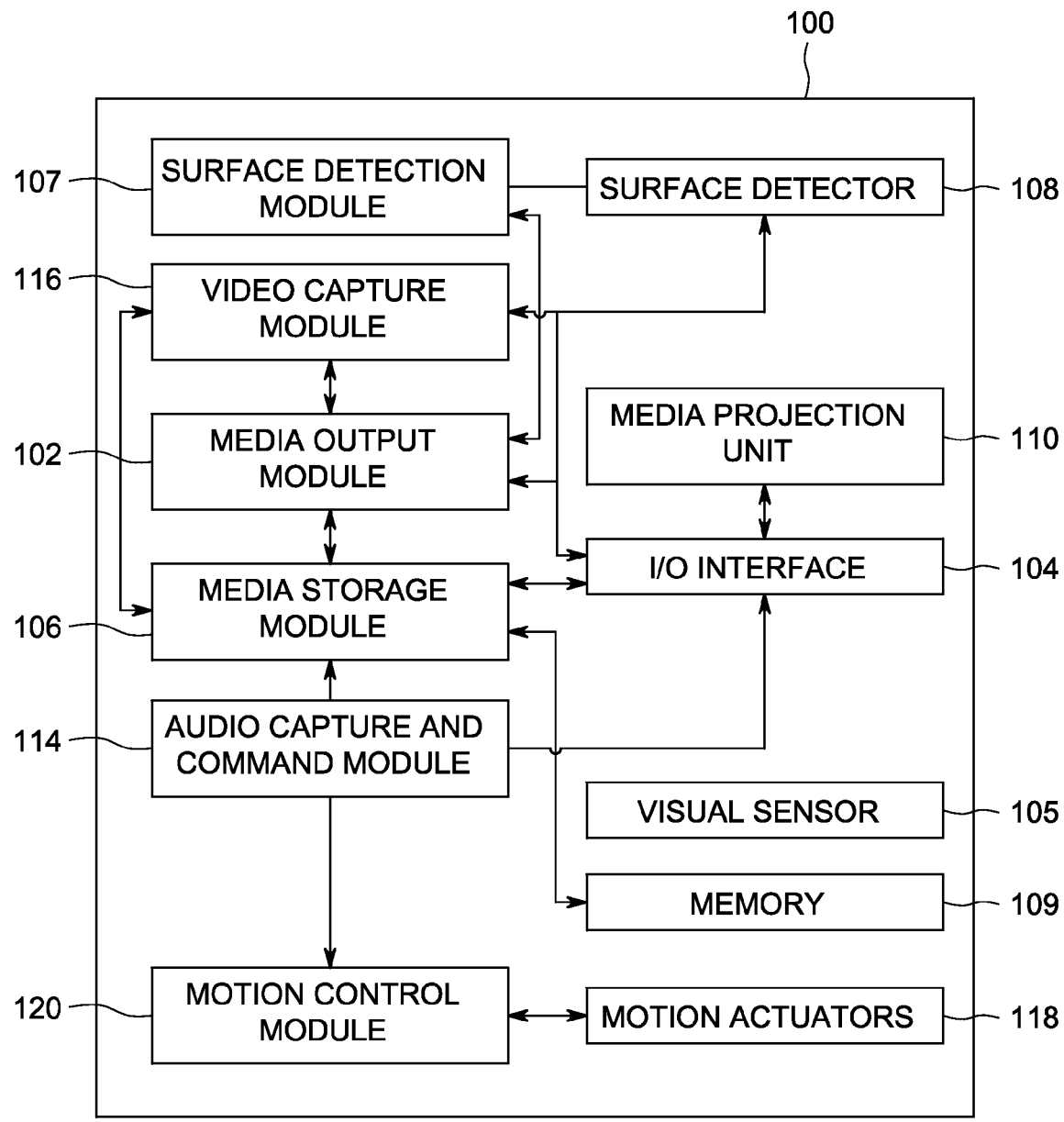
FIG. 1 depicts a functional block diagram representation of a robotic assistant for multipurpose applications, in accordance with exemplary embodiments of the present invention.

FIG. 1 depicts a functional block diagram representation of a robotic assistant 100 for multipurpose applications, in accordance with exemplary embodiments of the present invention. By way of example, and in no way limiting the scope of the invention, the robotic assistant 100 may be a modular, semi-autonomous robot with a microphone, camera and projector.

By way of example, and in no way limiting the scope of the invention, the robotic assistant 100 comprises a media output module 102, an input/output (I/O) interface 104, a media storage module 106, a surface detection module 107, a surface detector 108, memory 109, a media projection unit 110, an audio capture and command module 114, a video capture module 116, a motion control module 120, and motion actuators 118.

The I/O interface 104 is configured to couple with various sensing devices, data ports and the like that are external to the robotic assistant 100. According to some embodiments, I/O interface 104 couples with a universal serial bus (USB) port in the form of mini and micro USB interfaces. In certain scenarios, one or more input devices, such as a micro USB, micro HDMI and VGA, may be coupled through at least one of one or more analog and digital audio and video connectors and one or more USB data ports to the I/O interface 104 of the robotic assistant 100. One or more network devices, such as WiFi and Bluetooth® devices may be coupled through one or more USB data ports to the I/O interface 104 of the robotic assistant 100. In one embodiment, the I/O interface 104 is coupled to a memory card reader for transferring data from detachable storage media. In another embodiment, media is downloaded from the Internet and transferred via the I/O interface 104 for storage in the memory 109 of the robotic assistant 100. The I/O interface 104 may also be coupled with a visual sensor 105 for sensing a sequence of images, such as video. The video capture module 116 is used to capture the sensed video.

A user of the robotic assistant 100 may capture images with their personal phone or camera and insert the storage medium from that phone or camera into the memory card reader coupled to the I/O interface 104 of the robotic assistant 100. The media storage module 106 reads data from the I/O interface 104 coupled to the storage medium and transfers the data into the memory 109 of the robotic assistant 100. In one embodiment, there is a filter in the media storage module 106 so that only particular types of files are transferred from the storage medium to the memory 109. In this embodiment, the types of files transferred may be, for example, moving picture experts group (MPEG) 3/4 files, Joint Photographic Export Group (JPEG) files, Microsoft® Office® files, Audio Video Interleave (AVI) files and the like.

The surface detection module 107 is coupled with the I/O interface 104. The surface detection module 107 uses a surface detector 108 to scan sensed video from the visual sensor 105 to detect whether a surface is present in the video. The surface detector 108 interacts with the video capture module 116 and detects edges and corners in the video of a surface. In general, surface detection techniques are well-known to those of ordinary skill in the art. The surface detection module 107 estimates the dimensions and geometry of the projected region in the surface and sizes the media according to predetermined initial configuration parameters. In addition, the surface detection module 107 detects the optimal inclination angle and distance from the projected region in the surface, signaling the motion control module 120 to alter any one of the dimensions and geometry of, and inclination angle and distance from, the projection region. These calibrations are performed dynamically and independent of user input by the robotic assistant 100. However, the user may interact with the calibration if desired, and modify the initial parameters of the configuration.

The surface detection module 107 signals the motion control module 120 to have the robotic assistant 100 move both horizontally and vertically in iterations so as to fit the media in the projection region of the surface with proper proportions according to the configuration parameters, as well as automatically adjusting the projection for clarity and sharpness, in response to voice commands generated from the audio capture and command module 114. In addition, the surface detection module 107 signals the motion control module 120 to modify the inclination angle of the robotic assistant 100.

The video capture module 116 may also capture video at the direction of a user and store that video to memory 109 using the media storage module 106 of the robotic assistant 100. In addition, the audio capture and command module 114 also stores audio in memory 109 sensed by a coupling to the I/O interface 104, preferably through a microphone or other audio sensor. The audio capture and command module 114 captures audio and uses the media storage module 106 to store the audio to memory 109. The audio capture and command module 114 later may determine that the captured audio is an audio command to perform an action by the robotic assistant 100.

In one example, an audio command is operable to engage the motion control module 120. The motion control module 120 determines the type of motion the robotic assistant 100 will engage in by activating the motion actuators 118. In an exemplary embodiment, the motion actuators 118 are individual wheels, coupled wheels, Caterpillar® tracks or the like and the motion control module 120 accepts motion instructions in the form of coordinates or other spatial or direction and speed identifiers.

The media projection unit 110 is a device that, according to one embodiment, projects an image, a video, a presentation or any visual signal onto any surface, and commonly a projection screen. The media projection unit 110 can be used to project contents of files from the memory 109, which may be downloaded from the internet transferred from detachable media, or captured by the video capture module 116 of the robotic assistant 100. For example, if a user wants to project a paper document or an image of a prototype, in an exemplary embodiment the video capture module 116 captures video of the document or prototype and the media output module 102 interacts with the I/O interface 104 to send a signal to the media projection unit 110. The media projection unit 110 projects the signal onto a projection screen. In certain specific embodiments, the I/O interface 104 is used to receive data allowing the robotic assistant 100 to clone an external display, thereby facilitating easy viewing of images from the external display in a larger form. An external display is cloned when the media output module 102 detects an input video signal coupled to the I/O interface 104. The Media output module 102 then interacts directly with the I/O interface 104 to have the media projection unit 110 project the content of the external display onto a surface.

In exemplary embodiments, the robotic assistant 100 projects onto a wall-like surface using the media projection unit 110. The robotic assistant 100 accesses and retrieves the dimensional specifications, i.e. length and width, of the projection area. The robotic assistant 100 fits the images or videos to be displayed onto the projected area (or screen) with proper proportions.

In some embodiments, the video capture module 116 senses the projected area and treats the projection like a touch screen. For example, a user can perform gestures on the projected area and the projected image zooms out, zooms in, or rotates and translates according to the gesture. The video capture model 116 captures touch points relative to the projection surface, digitizes the touch points and translates the digitized points into matrix transforms applicable to the projected view. The media output module 102 re-displays the altered projection.

In some embodiments, the media projection unit 110 is detachable from the robotic assistant 100. For example, the media projection unit 110 can plug in to the robotic assistant 100, or can be added or mounted upon the robotic assistant 100. Thus, the projector 110 can be easily mounted on the robotic assistant 100 and carried around at all times, or dismounted and removed as needed.

Although in the above described exemplary embodiments the media projection unit 110 projects a two dimensional (2D) image, the invention is not limited thereto, and includes in other embodiments a projector that projects a signal that gives the viewer the perception of seeing a three dimensional (3D), holographic, image, for example by projecting two 2D images that are offset from each other so as to be displayed separately to the left and right eye of the viewer. In such embodiments where a holographic image is projected, surface detection module 107 would still sense a 2D surface upon which the 2D images are projected. In other embodiments a holographic image is projected onto a 3D display surface.

In even further embodiments the media projection unit 110 may include a transmitter, so that when the media projection unit 110 is used to project the image signal, instead of optical projection, the signal is transmitted electro-magnetically, typically wirelessly, to a remote display. The remote display is positioned such that a display surface thereof facilitates easy viewing of the desired media. Thus, as used in some embodiments, the word "projecting" also includes "transmitting"

In official use case scenarios, the robotic assistant 100 is used for multiple purposes including, but not limited to, capturing images and videos, multimedia projection, voice and/or video call management and dictations or transcriptions. For example, as an office assistant, the media projection unit 110 of the robotic assistant 100 can be used with features, such as dictations of meetings, video and/or voice call management, and capturing pictures of material presented in the meetings for future display.

Figure 2:
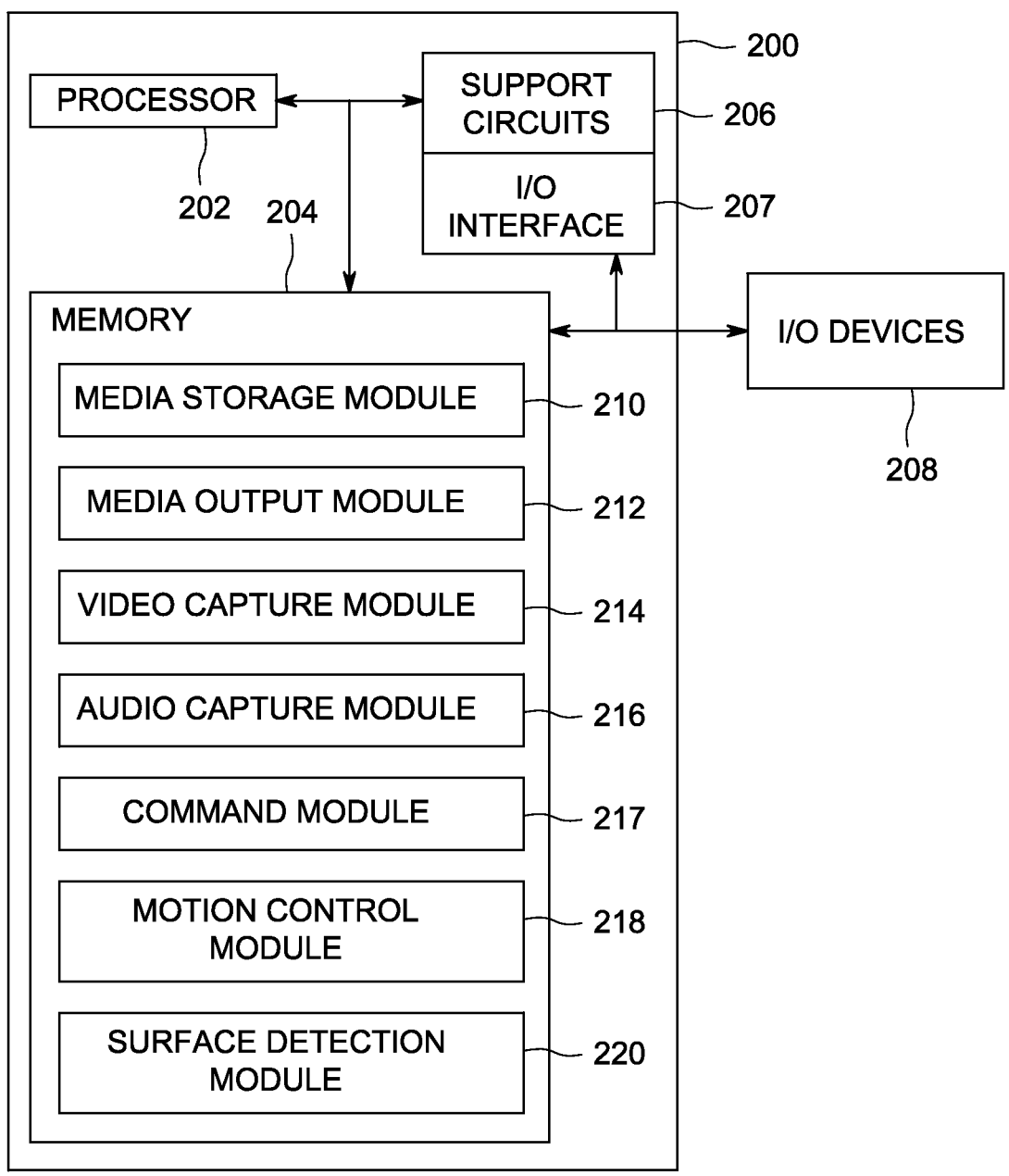
FIG. 2 is a block diagram of a computer system implementation of the robotic assistant, in accordance with exemplary embodiments of the present invention.

FIG. 2 is a block diagram of a computer system 200 in accordance with exemplary embodiments of the present invention. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, I/O interface 207, and the like. The I/O interface 207 may be directly coupled to the memory 204 or coupled through the supporting circuits 206. The I/O interface 207 may also be configured for communication with input devices and/or output devices, such as, network devices, various storage devices, mouse, keyboard, displays, sensors and the like, collectively referred to hereinafter as I/O devices 208.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise the media storage module 210, the media output module 212, the video capture module 214, the audio capture module 216, the motion control module 218 and the surface detection module 220. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

According to exemplary embodiments of the present invention, the software modules stored in memory 204 are software implementations of the media storage module 106, the media output module 102, the video capture module 116, the audio capture module 114, the motion control module 120 and the surface detection module 107 of FIG. 1. The motion control module 218 controls the motion actuators 118 and the other software modules send and receive signals to and from the I/O devices 208 through the I/O interface 207. In an exemplary embodiment, the media projection unit 110 of FIG. 1 is coupled to the system 200 as one of the I/O devices 208. The motion actuators 118 are also implemented as one of the I/O devices 208 and are controlled by the motion control module 218 to drive the robotic assistant 100 to move to a particularly specified location by a user of the assistant 100.

Figure 3:
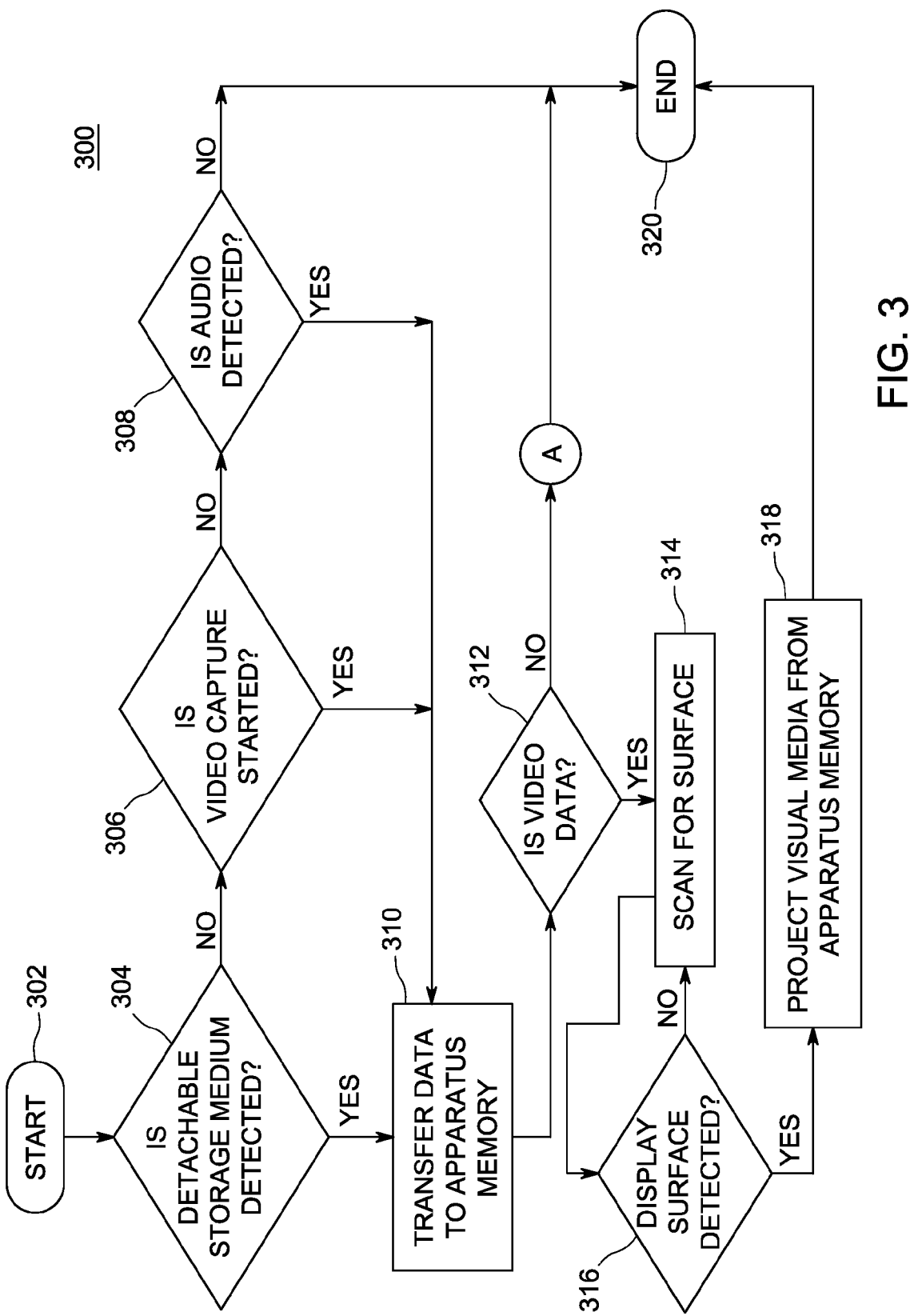
FIG. 3 depicts a flow diagram of a method for projecting visual media as performed by the robotic assistant, according to one or more embodiments of the present invention.

FIG. 3 depicts a flow diagram of a method 300 for projecting visual media as performed by the robotic assistant 100 of FIG. 1, according to one or more embodiments of the present invention. The method 300 represents execution of the robotic assistant 100 of FIG. 1, implemented as the computer system 200 of FIG. 2, according to an embodiment of the invention. The method 300 begins at step 302, and proceeds to step 304.

At step 304, the method 300 determines whether a detachable storage medium is detected at the I/O interface 104. The method moves to step 306 if no detachable storage medium is detected. At step 306, the method determines whether video capture is initiated by the user of the system 200. In this embodiment, a user can initiate a video capture similar to camera operation and store the captured video for later use.

In method 300, if video capture is not initiated by the video capture module 214, the method 300 proceeds to step 308 where it is determined whether audio input is detected by the audio capture module 216. If no storage medium is detected and video capture is not initiated, and audio is not detected, the method ends at step 320. If detachable storage media is detected, or video capture is initiated, or audio is detected, the method proceeds to step 310.

At step 310, data from the storage media, the video capture or audio capture is transferred to the memory 204 of the system 200. At step 213, the method 300 determines whether the data stored is video data. If the data is not video data, the method transfers control to method 400 described below, shown as "A" in FIG. 3.

If the data stored in memory 204 is video data, the surface detection module 220 performs surface detection on the video data. At step 316, if a display surface is not detected, the method returns to step 314 to perform surface detection. The surface detection module 220 searches for suitable surfaces for receiving the projected signal, include, for example without limitation, flat surfaces such as walls, desks and projection screens free of clutter, so that it may indicate to the media output module 212 that a proper surface is available. The robotic assistant 100 accesses the dimensions and geometry of the projected area on the screen. During the method 300, the robotic assistant 100 can move about within an area until the projection appears properly proportioned for suitable viewing on a projection surface.

If it has been determined that a display surface is detected at step 316, the method 300 moves to step 318, where the stored video data (media) from memory 204 is prepared for output by the media output module 212. The media output module 212 interacts with the media storage module 210 to retrieve the media from memory 204. The media output module 212 transfers the media to the media projection unit 110 of FIG. 1 through the I/O interface 207 for display. The method ends at step 320.

Figure 4:
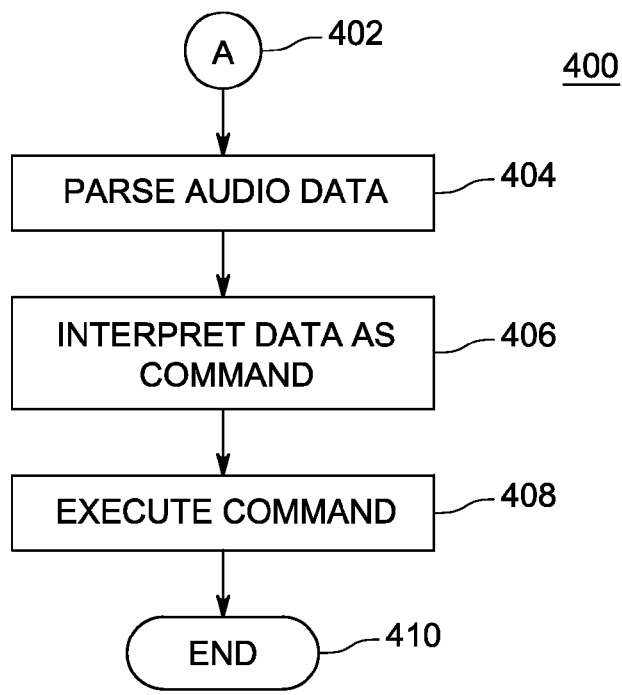
FIG. 4 depicts a flow diagram of a method for executing audio commands by the robotic assistant, according to one or more embodiments of the present invention.

FIG. 4 depicts a flow diagram of a method 400 for executing audio commands by the robotic assistant 100 of FIG. 1, according to one or more embodiments of the present invention. The method 400 represents execution of the audio capture and command module 114 implemented as the audio capture module 216 and executed by the computer system 200 using processor 202 of FIG. 2, according to an embodiment of the invention.

The method 400 begins at step 402, and proceeds to step 404. At step 404, the audio control module 216 parses the audio data stored in memory 204 of the system 200. The audio data may be simply a voice recording for accompanying a presentation, or may comprise complex voice commands for moving the robotic assistant 100, playing a video presentation, or initializing and shutting down the robotic assistant 100 and the like.

The method then proceeds to step 406, where the audio capture module 218 interprets the command portion of the audio data as a command for the robotic assistant 100 as described above. At step 408, the command module 218 executes the command and various ones of the above described modules of FIGS. 1 and 2 allow the robotic assistant 100 to perform the executed command. The method ends at step 410.

Figure 5:
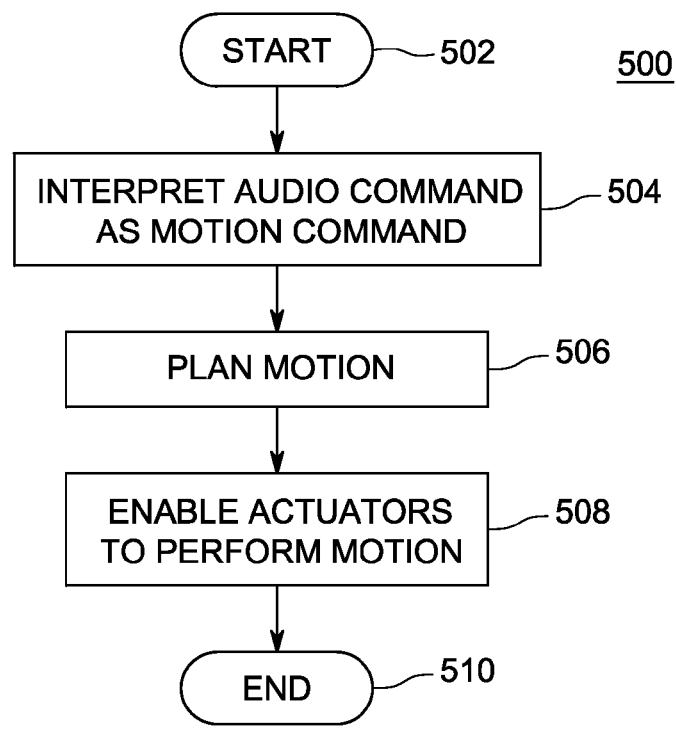
FIG. 5 depicts a flow diagram of a method for enabling motion of the robotic assistant by audio command, according to one or more embodiments of the present invention.

FIG. 5 depicts a flow diagram of a method 500 for enabling motion of the robotic assistant 100 by audio command, according to one or more embodiments of the present invention. The method 500 represents execution of the audio capture and command module 114, the motion control module 120 and the motion actuators 118 implemented as the audio capture module 216 and the motion control module 218, executed by the computer system 200 using processor 202 of FIG. 2, according to an embodiment of the invention.

The method 500 begins at step 502, and proceeds to step 504. At step 504, the command module 217 interprets the audio stored in memory 204 of the system 200 as a motion command. The audio data may comprise complex voice commands for moving the robotic assistant 100, playing a video presentation, or initializing and shutting down the robotic assistant and the like. In this embodiment, the audio command is a motion command for the robotic assistant 100.

The method then proceeds to step 506, where the command module 217 plans the motion of the robotic assistant 100 taking into account various obstacles in its path using well known methods for path finding. The motion command may be a rotation, a translation, or a combination of a plurality of rotations and translations, though the robotic assistant 100 is not limited to only these motions. In other embodiments, the robotic assistant 100 can tilt and adjust the media projection unit 110 to display on a particular surface such as the ceiling, or on a tilted surface.

Once the motion is fully planned by the command module 217, the command module 217 signals the motion control module 218. The motion control module 218 controls the motion actuators 118 through the I/O interface 207. The motion actuators 118 perform the planned motion for the robotic assistant 100. The method ends at step 510.

Figure 6:
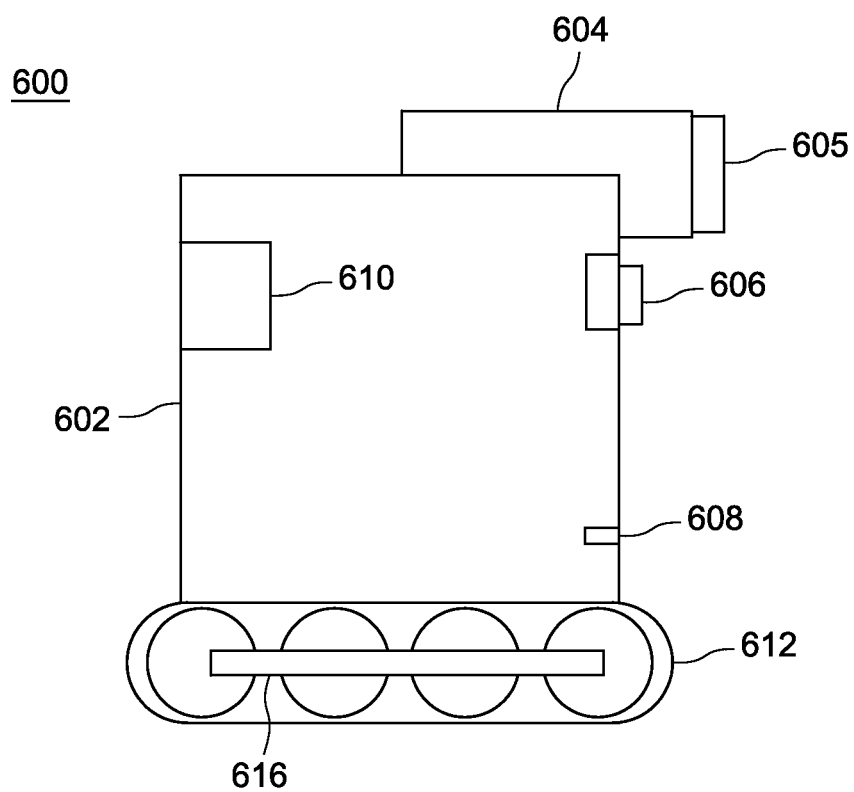
FIG. 6 is an illustration of an implementation of the robotic assistant as apparatus in accordance with embodiments of the present invention.

FIG. 6 is an illustration of an implementation of the robotic assistant 100 as apparatus 600 in accordance with embodiments of the present invention. The apparatus 600 comprises an enclosure 602, a media projection unit 604, a visual sensor 606, an audio sensor 608, an I/O reader 610 and motion actuators 612. In this embodiment, the motion actuators 612 are a set of two wheeled tracks positioned at opposite sides of enclosure 602, driven by a motor (not shown) so as to move enclosure 602 transversally along the wheel-shaft 616.

The media projection unit 604 is mounted at the top of the apparatus 600 in this embodiment, but may be at other locations in other embodiments. The media projection unit 604 may have an electronically controllable lens 605 for magnification, clarification and the like. In addition, in some embodiments, the media projection unit 604 is detachable via a direct data coupling which is USB, Firewire®, high definition media interface (HDMI), a proprietary coupling, or the like. In some instances, the audio sensor 608, the projector 604 and the visual sensor 606 are combined into a single unit and detachable from the main enclosure 602. In other instances, the audio sensor 608, the projector 604 and the visual sensor 606 are separately detachable from the main enclosure 602. In some embodiments, the audio sensor 608, the projector 604 and the visual sensor 606 are attachable to the enclosure 602 in several configurations and several locations across the enclosure 602.

The visual sensor 606 captures images and video to store in memory and is also equipped with an ocular lens for magnification. According to one embodiment, the visual sensor 606 may be positioned underneath the projector, or above the projector. In one embodiment, the visual sensor 606 must face the same direction as the media projection unit 604 in order to accommodate touch gestures on the projection surface. In other embodiments, however, the visual sensor 606 may be located on a different side of the enclosure 602 as that of the media projection unit 604. The audio sensor 608 is similarly located on the same side of enclosure 602 as the media projection unit 604 and the visual sensor 606, although the present invention does not limit the audio sensor 604 from being located on the adjacent or opposite side of the visual sensor 606. The I/O reader 610 can be located on any side of the enclosure 602 that is conveniently accessible by a user of the apparatus 600.

The enclosure 602 may also have a plurality of media projection units 604, visual sensors 606, audio sensors 608 and I/O readers 610. In one embodiment, the visual sensor 606 is a three-dimensional sensor and the media projection unit 604 is capable of projecting three-dimensional images onto a projection surface.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium, but exclude transitory media such as transitory waves. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A robotic assistant comprising:
   a surface detection module configured to detect a surface and dimensions and geometry of the surface;
   a projector configured to project media in accord with proportions of the media on the surface;
   a sensor configured to sense audio and video data in the surrounding environment, wherein the audio data is used to control the robotic assistant and is stored for later use; and
   a motion control module configured to move the robotic assistant according to the sensed audio and video data based on the dimensions and geometry of the surface and the media proportions, and to modify projection calibrations.

2. The robotic assistant of claim 1, wherein the projector is detachable from an enclosure of the robotic assistant.

3. The robotic assistant of claim 1, wherein the sensor senses a user-performed gesture on the surface by capturing touch points relative to the surface, a video capture module forms a matrix transform of the touch points and alters the media, and the projector projects the altered media.

4. The robotic assistant of claim 1, wherein the motion control module controls movement of the robotic assistant horizontally, vertically, and rotationally in iterations so as to fit the media onto the flat surface with proper proportions.

5. The robotic assistant of claim 4, further comprising an audio capture module coupled to the sensor that interprets the audio data as voice commands.

6. The robotic assistant of claim 5 further comprising a command module that executes the voice commands to control at least one of the projector and the motion control module.

7. The robotic assistant of claim 1 wherein the media projected by the projector comprises a clone of a user display.

8. The robotic assistant of claim 1 wherein the motion control module comprises two sets of wheels.

9. The robotic assistant of claim 1 wherein the surface detection module searches for surfaces which have dimensions proportional to those of the projected media.

10. The robotic assistant of claim 9 wherein the surface detection module commands the motion control module to relocate the robotic assistant to a new location.

11. A method of utilizing a robotic assistant, the method being executed by at least one processor, comprising the steps of:
   scanning, using a video sensor, an environment for a surface and dimensions and geometry of the surface;
   projecting, using a projector, media in accord with proportions of the media on the surface;
   sensing audio and video data in the surrounding environment, wherein the audio data is used to control the robotic assistant and is stored for later use as the media to be projected; and
   moving the robotic assistant according to the sensed audio and video data based on the dimensions and geometry of the surface and the media proportions, and modifying projection calibrations.

12. The method of claim 11, wherein the projector is detachable from an enclosure of the robotic assistant.

13. The method of claim 11, further comprising:
   sensing a user-performed gesture on the surface by capturing touch points relative to the surface; and
   forming a matrix transform of the touch points, altering the media based on the matrix transform, and the projecting the altered media.

14. The method of claim 11, further comprising moving the robotic assistant horizontally, vertically, and rotationally in iterations so as to fit the media onto the flat surface with proper proportions.

15. The method of claim 14, further comprising interpreting the audio data as voice commands.

16. The method of claim 15 further comprising executing the voice commands to control at least one of the projecting and the moving.

17. The method of claim 11 further comprising detecting a second surface on which to display the media.

18. The method of claim 11 further comprising projecting one of 2D and 3D projecting.

19. The method of claim 17 further comprises searching for surfaces which have dimensions proportional to those of the projected media.

20. The method of claim 19 further comprising relocating the robotic assistant to a new location in response to the searching.

* * * * *